June 17, 1924.
G. C. HESTON
HARROW
Filed Dec. 17, 1921
1,497,721
2 Sheets-Sheet 1.
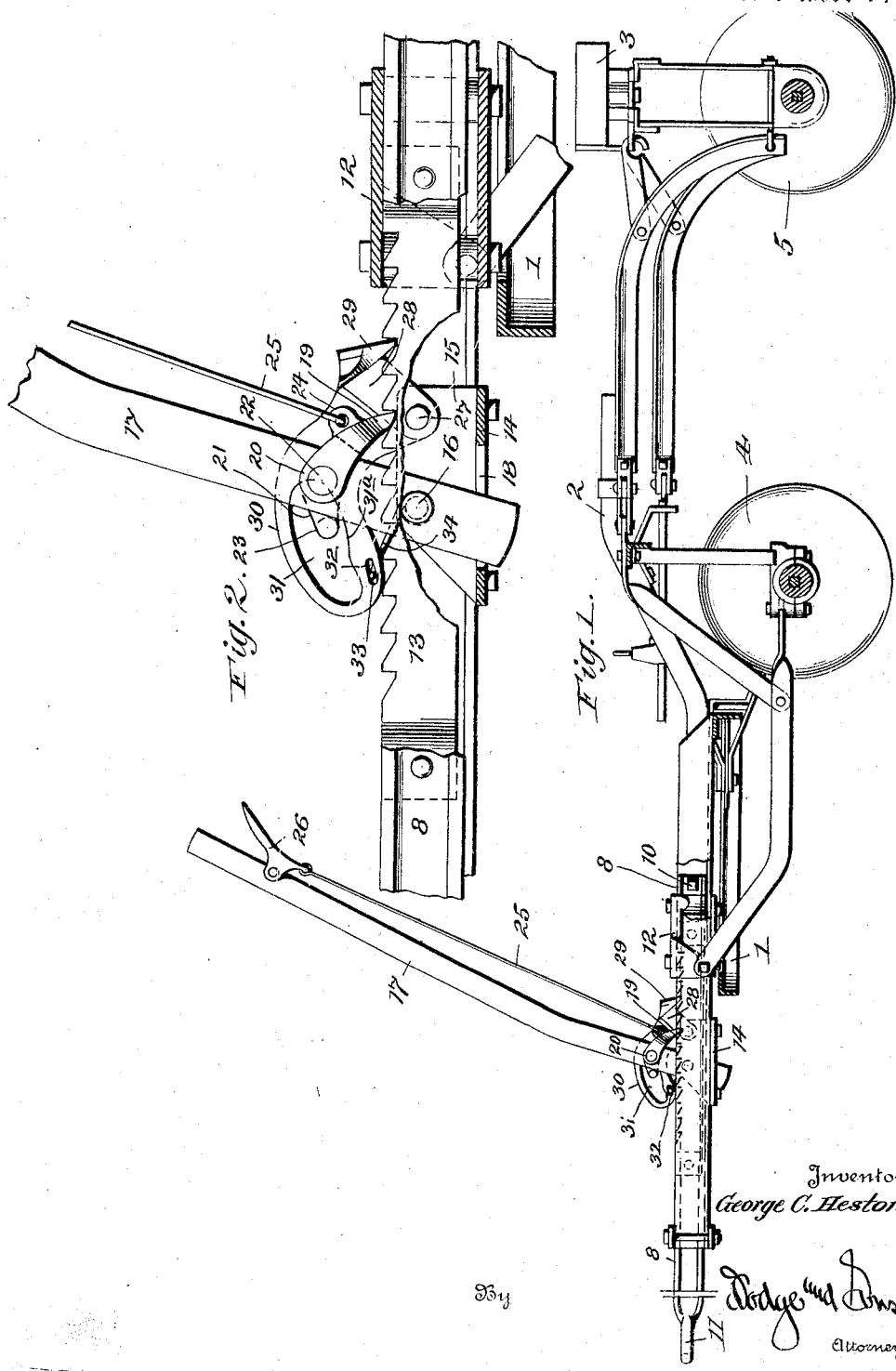
Inventor
George C. Heston,
By Dodge and Sons
Attorneys

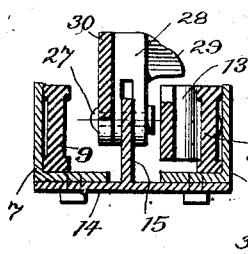
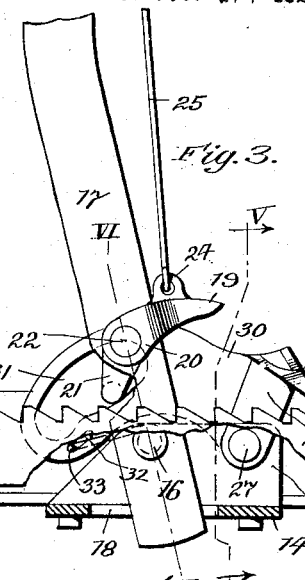
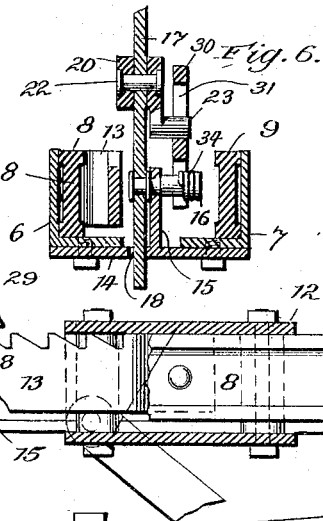
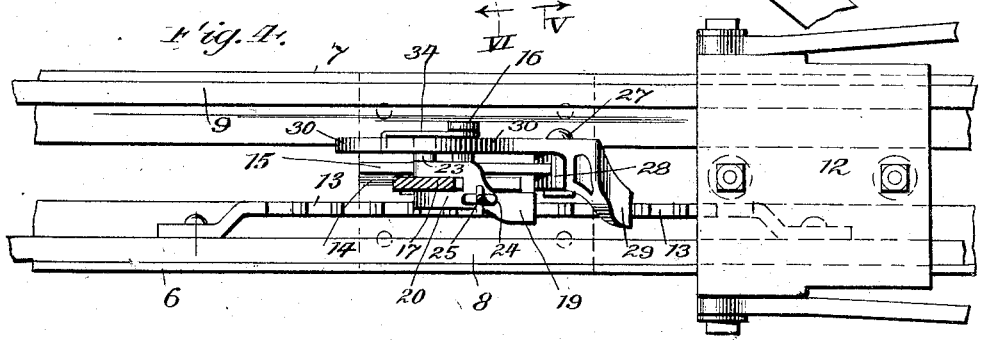
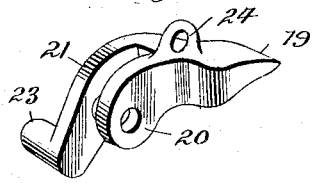
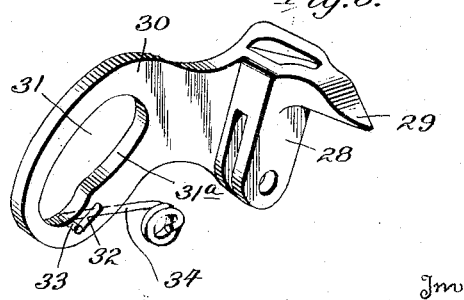

Patented June 17, 1924.

1,497,721

UNITED STATES PATENT OFFICE.

GEORGE C. HESTON, OF MANSFIELD, OHIO, ASSIGNOR TO RODERICK LEAN MANUFACTURING COMPANY, OF MANSFIELD, OHIO, A CORPORATION OF NEW JERSEY.

HARROW.

Application filed December 17, 1921. Serial No. 523,148.

*To all whom it may concern:*

Be it known that I, GEORGE C. HESTON, a citizen of the United States, residing at Mansfield, in the county of Richland and State of Ohio, have invented certain new and useful Improvements in Harrows, of which the following is a specification.

This invention pertains to disk harrows, and more particularly to tractor disk harrows, wherein the various disk units are designed to be placed at varying angles to the line of draft and to each other.

The object of the present improvement is to provide means whereby the gangs of a disk harrow can be angled or straightened with the slightest effort on the part of the operator while the tractor and harrow are in motion.

For the purpose of illustration, the invention is shown in conjunction with a harrow of the type set forth and claimed in the application of Frederick C. Warne, filed December 17, 1921, Serial No. 523,158, though, of course, it is to be understood that the mechanism is applicable to any type of harrow wherein means is provided for straightening or angling the gangs with reference to each other and the line of draft.

In the annexed drawings,—

Fig. 1 is a longitudinal vertical section of the harrow;

Fig. 2 a similar view, with the parts broken away, of a portion of the front frame, the stub pole, the draft clevis, and the actuating and locking pawls, the latter being in their lowered or locking position;

Fig. 3 is a similar view with the operating lever thrown forwardly and with the pawls in their raised position;

Fig. 4 a top plan view of such parts, the operating handle or lever being shown in section;

Fig. 5 a transverse sectional view taken on the line V—V of Fig. 3;

Fig. 6 a similar view taken on the line VI—VI of Fig. 3;

Fig. 7 a perspective view of the lever dog which cooperates with a rack secured to the clevis; and Fig. 8 a similar view of a locking or master dog which holds the parts in their adjusted position.

The main or forward frame of the harrow is denoted by 1, having a rearward extension 2 rigidly secured thereto. The rear frame is denoted by 3. The forward and rear gangs, denoted by 4 and 5, respectively, are secured to the frames in such manner as they may pivot with reference thereto and to each other so as to assume different angular positions. It is, of course, understood, that the forward gangs are composed of two units, located one to each side of the center line of draft, and the same is true of the rear gangs, and this construction is shown and claimed in Letters Patent to Warne, 1,344,159, dated June 22, 1920, to which reference is made. Inasmuch as the present invention has to deal only with the means for securing the adjustment of the draft elements, it is not deemed necessary to illustrate the gangs in detail.

Secured to the front frame 1 is a stub axle composed of two angle bars 6 and 7 in which the draft clevis is mounted for longitudinal adjustment. Said clevis comprises two longitudinally disposed bars or members 8 and 9, the rear ends of which are secured together by suitable bolts 10, the forward end of the clevis being shaped into an eye 11 so that the tractor may be readily coupled thereto. The adjustment of the clevis determines the angularity of the gangs, and said clevis cooperates with a block or member 12 mounted for longitudinal movement upon the stub pole, said block being connected through suitable draft links with the gangs and thereby determining the position of the gangs when draft is applied to the clevis. Rigidly affixed to the element 8 of the clevis is a toothed rack 13, adapted to function with the lever and locking dogs in a manner hereinafter set forth. Bolted to the under face of the stub pole is a plate 14 having an upwardly extending member or bracket 15, to which, at 16, is pivoted, an actuating lever 17. As will be best seen upon reference to Fig. 2, the lower end of said lever passes through an opening 18 formed in the bottom plate 14 of the bracketed member and the ends of the slot form a stop to limit the swing of the lever. Pivotally secured to the lever is an actuating dog, of the form best shown in Fig. 7. It may be said to comprise a nose or detent portion 19 adapted to coact with the teeth of the rack 13, and two rearwardly extending arms 20 and 21, the latter being longer than the former, extending rearwardly of the openings formed in the arms for the reception of the pivot bolt 22, which secures the dog to the lever 17. The rearwardly extending arm 21 is provided with a laterally projecting finger or extension 23 adapted to coact with the locking dog or pawl in the manner hereinafter set forth. The actuating pawl is provided with an eye 24 into which is secured the lower end of a draw link or wire 25 adapted to be actuated by a handle 26 fulcrumed upon the main lever 17. The parts are so formed and connected that the pawl will drop by gravity and if allowed to, will always engage and rest upon the rack, in other words, the pawl is a gravitating one. Fulcrumed to the bracket member 15 upon a pin 27 is a locking dog shown in detail in Fig. 8. Said dog is provided with a bifurcated lower portion 28 which straddles the bracket member 15, and at the upper portion thereof is provided with a laterally extending tooth or detent 29 adapted to function with the teeth of the rack 13 to hold the rack against forward movement under draft when the parts are in the position shown in Figs. 1 and 2. Said dog is provided with a rearwardly extending wing or member 30 having an elongated opening 31 formed therein into which, when the parts are assembled, the finger 23 of the actuating pawl extends. Below the opening 31 at the rear of the wing or extension member 30, is a second slot or opening 32 adapted to receive the inturned end 33 of the free arm of a spring 34, the opposite end of the spring being securely fastened to the pivot pin or bolt 16 upon which the lever 17 is fulcrumed. Said spring exerts an upward thrust upon the arm or rear extension 30 of the locking dog and serves to throw the detent 29 thereof into locking engagement with the rack 13.

The lever 17 is located at a point where it may be readily reached by the operator in the cab of the tractor which is attached to the clevis, and may be readily manipulated when so desired. The clevis may, of course, be moved rearwardly by merely backing up the tractor, or, if the tractor is not attached, the clevis may be moved rearwardly by a swinging motion imparted to the actuating lever 17, the teeth 19 of the pawl engaging the teeth of the rack 13 and moving the same rearwardly while the detent 29 of the dog rides over the teeth and drops down into locking engagement therewith when the movement of the lever is stopped.

In case it should be desired to change the angularity of the gangs or to allow them to come to a straight position while the harrow is in motion, the operator need only draw the handle 26 forwardly, which has the effect of first raising the pawl from engagement with the teeth of the rack and as the pawl clears the teeth the arm 23 contacts the lower face 31ª of the slot or opening formed in the rear extension of the dog and serves, as the lever is thrown from the position shown in Fig. 2 to that shown in Fig. 3, to rock the dog about its pivot 27, lifting the detent 29 thereof free of the teeth of the rack 13. Inasmuch as the arm 23 bears upon the face 31ª at a considerable distance from the pivot 27, a favorable leverage is had to effect the lifting of the detent 29. This favorable leverage is, of course, amplified by the length of the actuating lever 17 so that notwithstanding the draft which is applied through the rack and detent 29 the parts may be released with but little expenditure of power or effort on the operator's part.

In addition to the ease of operation owing to the favorable leverage which obtains between the parts, the device may be actuated so as to effect the adjustment step by step, that is to say, notch by notch. With the ease of release the operator may readily put the dog back into locking engagement, such reengagement being assisted through the operation of the spring 34.

What is claimed is:—

1. In a harrow, the combination of a frame; a clevis mounted for forward and rearward adjustment thereon; a member coacting with the clevis to control the position of the gangs of the harrow; a toothed rack secured to the clevis; a lever connected to a fixed portion of the frame; a pawl pivoted to the lever and coacting with the rack to secure a relative movement between the clevis and frame upon an actuation of the lever; a finger extending from the pawl at a point in rear of its pivot; and a locking dog cooperating with the rack, said dog being pivoted to a fixed portion of the frame and having an opening into which the finger on the pawl extends, said arm serving, when the pawl is raised and the lever is swung to rock the dog and to raise the dog out of operative relation with the rack.

2. In a setting mechanism for harrows employing gangs which are susceptible of being angled with reference to each other and the line of draft, the combination of two relatively adjustable draft members; a toothed rack secured to one of said members; a locking dog pivoted to the other of said members and adapted to engage the rack said dog having an opening formed in a portion thereof; a lever fulcrumed on the same member as the dog; a pawl pivoted on the lever, said pawl engaging the rack and likewise provided with a finger passing into the opening in the dog; and means for raising the pawl.

3. In a setting mechanism for harrows employing gangs which are susceptible of being angled with reference to each other and the line of draft, the combination of two relatively adjustable draft members; a toothed rack secured to one of said members;

a locking dog pivoted to the other of said members and adapted to engage the rack, said dog having an opening formed in a portion thereof; a spring serving to hold the dog in engagement with the rack; a lever fulcrumed on the same member as the dog; a pawl pivoted on the lever, said pawl engaging the rack and likewise provided with a finger passing into the opening in the dog; and means for raising the pawl.

4. In a harrow in which the gangs may be set at an angle to each other, the combination of a stub pole; a clevis mounted thereon for longitudinal adjustment; a toothed rack secured to the clevis; a bracket member secured to the pole; a lever fulcrumed on said bracket member; a gravitating pawl fulcrumed on the lever and normally engaging the rack, said pawl having an extension provided with a laterally extending finger; means carried by the lever for raising the pawl; and a locking dog pivoted to the bracket member, said dog having a detent engaging the rack, and an extension on the opposite side of its pivot with an opening therein into which the finger of the pawl extends.

5. In a harrow in which the gangs may be set at an engle to each other, the combination of a stub pole; a clevis mounted thereon for longitudinal adjustment; a toothed rack secured to the clevis; a bracket member secured to the pole; a lever fulcrumed on said bracket member; a gravitating pawl fulcrumed on the lever and normally engaging the rack, said pawl having an extension provided with a laterally extending finger; means carried by the lever for raising the pawl; a locking dog pivoted to the bracket member, said dog having a detent engaging the rack, and an extension on the opposite side of its pivot with an opening therein into which the finger of the pawl extends; and a spring serving to rock the dog and throw the detent into engagement with the rack.

6. In a harrow in which the gangs may be set at an angle to each other and to the line of draft, the combination of two relatively adjustable draft members; a lever fulcrumed with reference to one of said members; a toothed rack secured to the other member; and a combined actuating and locking mechanism, comprising an actuating pawl pivoted to the lever; and a dog pivoted on the draft member to which the lever is fulcrumed, said dog and pawl having an inter-engagement to that side of their pivotal connections which is remote from those portions which engage the rack.

7. In a harrow in which the gangs may be set at an angle to each other and to the line of draft, the combination of a stub-pole; a clevis mounted for adjustment thereon; a member secured to the stub pole and provided with an upward extending bracket; a lever fulcrumed on said bracket, the lower end whereof passes through a slot in said member, the end walls whereof form stops to limit the movement of the lever; a toothed rack secured to the clevis; a gravitating pawl pivoted on the lever and engaging the rack; means carried by the lever for raising the pawl; an arm extending from the pawl forward of its pivotal point; a finger extending laterally from the arm; and a locking dog pivoted to the bracket, said dog having a detent to engage the rack, and an oppositely extending relatively long lever arm or extension, said lever having an opening formed therein into which the finger of the pawl extends.

8. In a harrow in which the gangs may be set at an angle to each other and to the line of draft, the combination of a stub pole; a clevis mounted for adjustment thereon; a member secured to the stub pole and provided with an upwardly extending bracket; a lever fulcrumed on said bracket, the lower end whereof passes through a slot in said member, the end walls whereof form stops to limit the movement of the lever; a toothed rack secured to the clevis; a gravitating pawl pivoted on the lever and engaging the rack; means carried by the lever for raising the pawl; an arm extending from the pawl forward of its pivotal point; a finger extending laterally from the arm; a locking dog pivoted to the bracket, said dog having a detent to engage the rack, and an oppositely extending relatively long lever arm or extension, said lever having an opening formed therein into which the finger of the pawl extends; and a spring acting on the dog to rock the same and to cause the detent thereof to assume a locking relation with the teeth of the rack.

In testimony whereof I have signed my name to this specification.

GEORGE C. HESTON.